United States Patent [19]

Herbert

[11] Patent Number: 4,868,382

[45] Date of Patent: Sep. 19, 1989

[54] FIBER-OPTIC MATERIAL SENSING SWITCH

[75] Inventor: Brent D. Herbert, Fergus Falls, Minn.

[73] Assignee: Jenoff Incorporated, Fergus Falls, Minn.

[21] Appl. No.: 273,908

[22] Filed: Nov. 21, 1988

[51] Int. Cl.$^4$ ................................................ H01J 5/16
[52] U.S. Cl. .................................. 250/227; 250/231 P
[58] Field of Search ...................... 250/227, 231 P, 551; 73/705

[56] References Cited

U.S. PATENT DOCUMENTS

| | | | |
|---|---|---|---|
| 4,031,342 | 6/1977 | Peterson | 200/61.21 |
| 4,044,209 | 8/1977 | Peterson | 200/61.21 |
| 4,620,093 | 10/1986 | Barkhoudarian et al. | 250/231 P |

Primary Examiner—David C. Nelms
Attorney, Agent, or Firm—Zarley, McKee, Thomte, Voorhees & Sease

[57] ABSTRACT

A material sensing switch comprising a body having an open first end and a second end closed by a wall member. A flange extends outwardly from the body at the first end thereof for securing the body to a supporting structure. A backing plate removably closes the first end to define an interior body compartment between the backing plate and the inner surface of the wall member. A fiber optic switch is positioned within the body compartment and has a plunger extending therefrom so that the outer end thereof is positioned outwardly of the outer surface of the wall member. A pressure plate is removably mounted on the second end of the body at the outer surface of the wall member and is adapted to engage the switch plunger to actuate the fiber optic switch upon movement of the pressure plate relative to the plunger. A flexible member is removably secured to the body at the second end thereof and covers the pressure plate. A ring member secures the flexible member to the body. An adjustment spring is provided for yieldably resisting the movement of the pressure plate towards the switch plunger. The backing plate, body, flexible member and ring are comprised of a non-corrosive material.

1 Claim, 2 Drawing Sheets

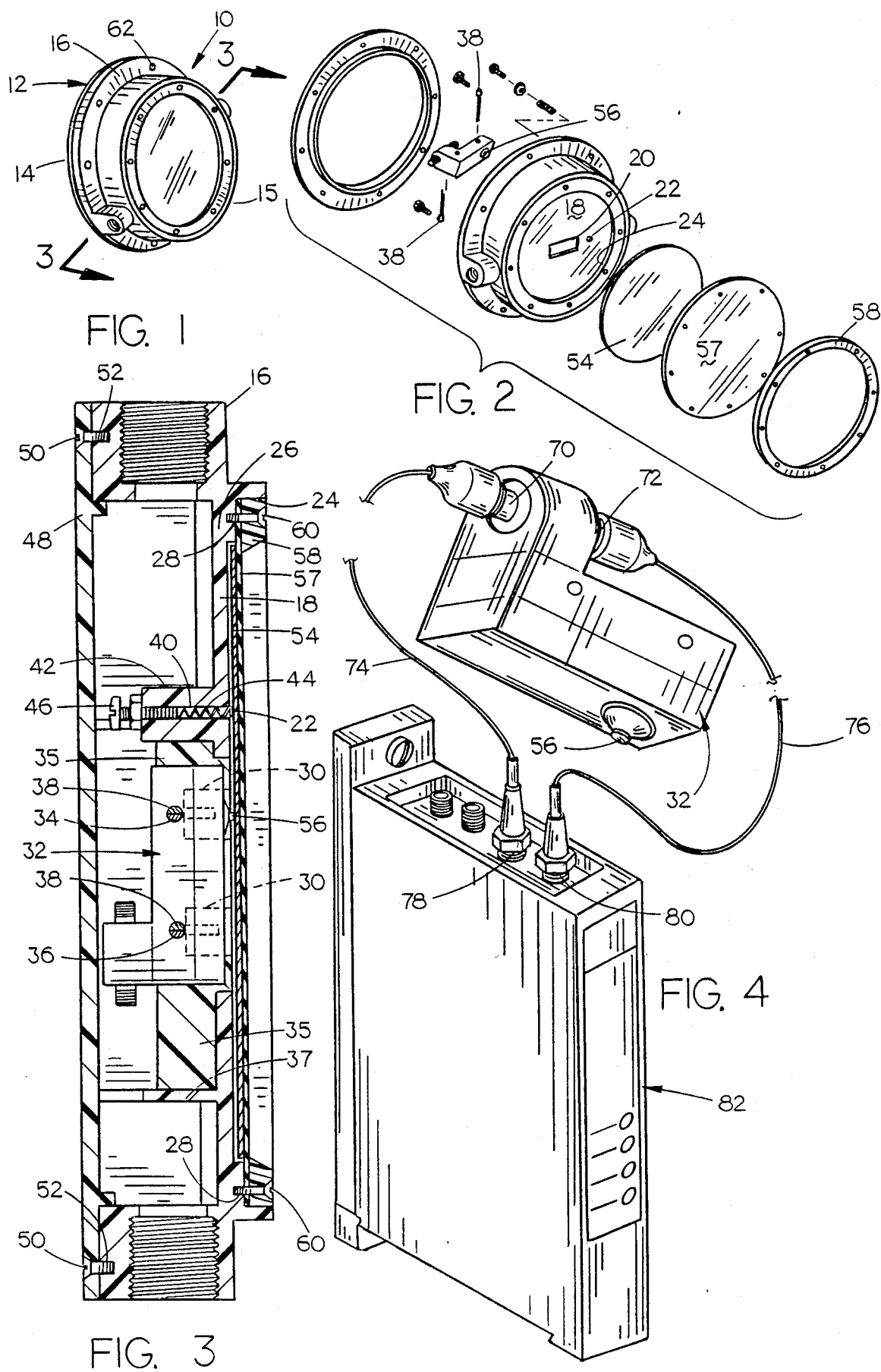

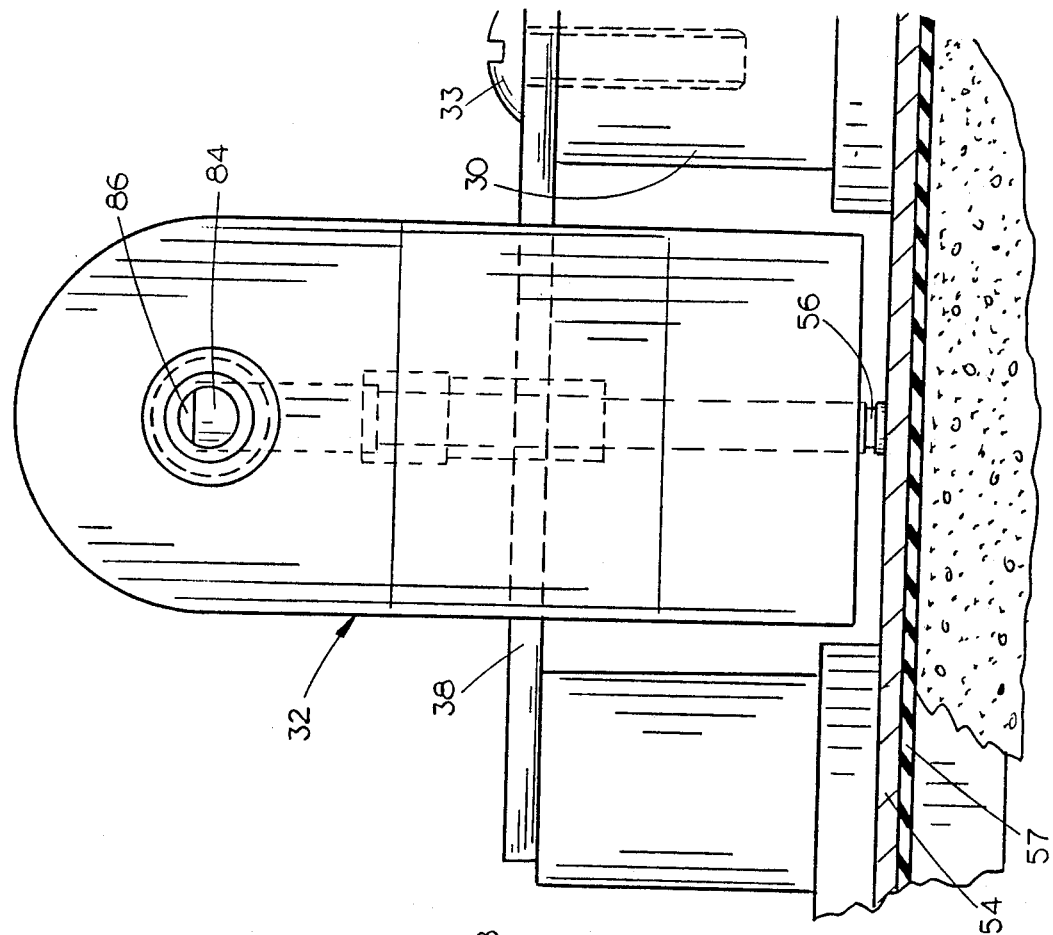
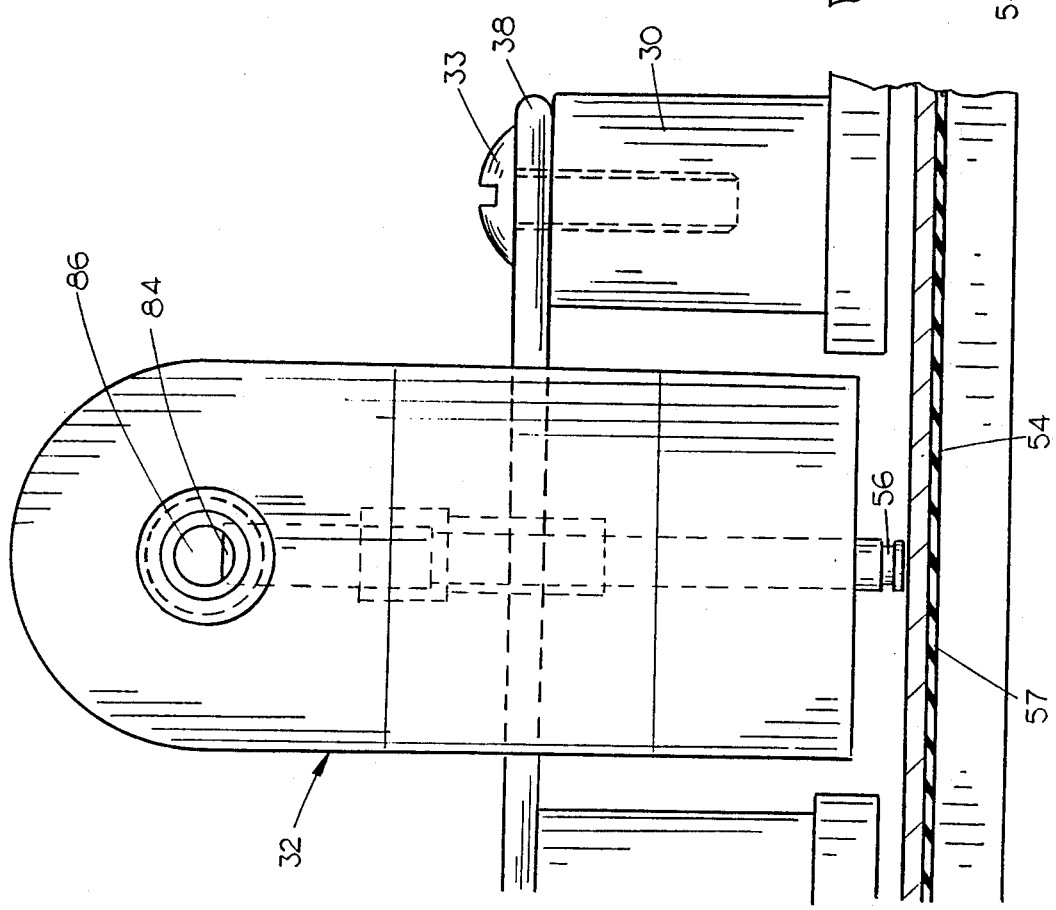

4,868,382

FIBER-OPTIC MATERIAL SENSING SWITCH

BACKGROUND OF THE INVENTION

This invention relates to a material sensing switch and more particularly to an improved material sensing switch which is ideally suited for use in dusty conditions such as bins, tanks, cement silos, etc.

Many material sensing switches have been previously provided but none have met with considerable success due to the environment in which they are normally used to sense the presence or absence of material. Material sensing switches are commonly used in bins or the like to sense the presence or absence of material at a particular level within the bin. It is essential that a switch be provided which will function in dusty conditions and which will not create dangerous and hazardous sparks. It is also essential that the switches be comprised of a material which will not be damaged by the corrosive nature of the materials being sensed.

In assignee's earlier patents, namely U.S. Pat. Nos. 4,031,342 and 4,044,209, improved material sensing switches are described. This invention is designed to completely eliminate any possibility of sparks or arcs being created by the switching device.

Therefore, it is a principal object of the invention to provide an improved material sensing switch.

A further object of the invention is to provide an improved material sensing switch which utilizes a fiber optic switch mechanism thereby eliminating the possibility of dangerous sparks or arcs when the switch mechanism is actuated.

These and other objects will be apparent to those skilled in the art.

BRIEF DESCRIPTION OF THE DRAWINGS

FIG. 1 is a perspective view of the switch of this invention:

FIG. 2 is an exploded view of the switch of this invention:

FIG. 3 is a sectional view seen on lines 3—3 of FIG. 1:

FIG. 4 is a plan view of the assembly with the backing plate removed and with the poured epoxy being cut away to more fully illustrate the invention:

FIG. 5 is a plan view of the assembly with the outer ring, flexible member and pressure plate removed; and FIG. 6 is a plan view of the assembly with the outer ring, flexible member and pressure plate removed, in a second position relative to FIG. 5.

DESCRIPTION OF THE PREFERRED EMBODIMENT

The material sensing switch of this invention is referred to generally by the reference numeral 10. Switch 10 includes a body 12 having ends 14 and 15. Body 12 is provided with a flange 16 extending outwardly therefrom at end 14 for mounting the switch to a supporting structure.

Body 12 is provided with a wall member 18 spaced inwardly of end 16 and which has a rectangular opening 20 formed therein. Wall 18 is also provided with a circular opening 22 formed therein for a purpose to be described in greater detail hereinafter. Body 12 also includes a recessed portion 24 extending inwardly into end 16 which defines an annular shoulder 26 positioned at the periphery of wall member 18. A plurality of threaded openings 28 are provided in annular shoulder 26.

A plurality of spaced-apart posts 30 extend from the inner surface of wall member 18 at opposite sides of the opening 20. The numeral 32 refers to a fiber optic switch which is positioned in opening 20 and which has a pair of spaced-apart openings 34 and 36 extending therethrough. Switch 32 is initially maintained in position by means of cotter keys 38 threadably secured to the posts by screws 33 and extending through the openings 34 and 36. The numeral 35 refers to a hardened epoxy material or compound which is poured in the interior of ring 37. Epoxy 35 covers the screws 33 to maintain the switch 32 in adjustment and in position.

Opening 22 communicates with a bore 40 formed in post 42 which extends from inner surface of wall 18. Spring 44 is received by opening 22 and bore 40. Adjustment screw 46 is threadably mounted in bore 40 for selectively varying the position of the spring 44 within opening 22 and bore 40. Backing plate 48 selectively closes end 14 by means of screws 50 extending through backing plate 48 and into threaded openings 52 formed in flange 16. The numeral 54 refers to a pressure plate which is positioned adjacent the outer surface of wall 18 inwardly of the annular shoulder 26. Pressure plate 54 is adapted to engage the plunger or switch actuator 56 extending from switch 32. A flexible member 57 preferably comprised of a rubberized-nylon material is positioned within end 16 of body 12 and covers the annular shoulder 26 and backing plate 54. Flexible member 57 is held in position by a base ring 58 by means of screws 60 extending through ring 58, flexible member 57 and into the threaded openings 28.

Fiber optic switch 32 includes a pair of oppositely disposed connectors 70 and 72 which are adapted to be connected to the ends of fiber optic cables 74 and 76 respectively which are connected to the emitter 78 and the receiver 80 of a conventional transceiver 82 which is energized when the optical circuit is closed within the switch 32. Switch 32 is conventional in design and may be such as that sold by Micro Switch, a division of Honeywell, under the CJ Series line. Switch 32 may be either of the normally open or normally closed type and includes a movable shutter 84 therein which interrupts the flow of light there bore 86 when plunger 56 moves the shutter 84 between the light emitting fiber optic cable and the light receiving fiber optic cable positioned at opposite ends of bore 86.

In operation, the switch 10 could be mounted in a storage bin or the like by means of bolts extending through the openings 62 in flange 16 so that flexible member 57 would be engaged by the material within the bin. If switch 32 is normally open, pressure of the material against the flexible member 57 will cause pressure plate 54 to move plunger 56 inwardly into the switch 32 so that the switch 32 will be closed thereby activating some form of signal device such as a light, buzzer, etc. connected to the switch which will indicate that the material in the bin or the like has reached the level of the switch 10. The adjustment screw 46 permits the selective adjustment of the resistance of the spring 44 against the inside surfaces of the pressure plate 54. In other words, if adustment screw 46 is threadably moved inwardly into the bore 40, the spring 44 will be compressed between the inner end of screw 46 and pressure plate 56 to increase the yieldable resistance against the inward movement of the plate 54 so that greater pressure on pressure plate 54 activates the switch 32.

Preferably, backing plate 48 and body 12 are comprised of a plastic material to prevent the corrosive material being sensed from damaging the assembly. The rubber-nylon construction of flexible member 57 and the nylon construction of the ring 58 prevents the corrosive material being sensed from damaging the components. The base ring 58 and its relationship to the flexible member 57 as well as the pressure plate 54 ensures that dust will not enter the interior of the switch. The switch is easily mounted within the bin and is easily serviced due to the construction of the assembly. The fiber optic switch 32 functions without any attendant sparks or arcs being created during the operation thereof since it is not electrical in nature.

Thus it can be seen that the invention accomplishes at least all of its stated objectives.

I claim:

1. A material sensing switch assembly comprising, a cylindrical body means having first and second end, said second end of said body means being closed by a wall means having inner and outer surfaces, said wall means having a first opening formed therein, a backing plate means removably closing said first end to define an interior compartment between said backing plate means and said wall means, a fiber optic switch means secured to said body means within said interior compartment adjacent the inner surface of said wall means, said fiber optic switch means having a switch actuator extending outwardly through said first opening in said wall means, a movable pressure plate means positioned at said second end of said body means at the outer surface of said wall means for engagement with said switch actuator to activate said fiber optic switch means when said pressure plate means is moved towards said wall means by pressure exerted thereon, a flexible member operatively removably secured to said second end of said body means and covering said pressure plate means, means securing said flexible member to said body means, a transceiver means located remotely of said fiber optic switch, fiber optic cable operatively connected to said transceiver means and said fiber optic switch, said fiber optic switch indicating to said transceiver means when sufficient pressure is applied to said pressure plate means to interrupt the flow of light through said fiber optic switch.

* * * * *